US012500335B2

(12) United States Patent
Suzuki et al.

(10) Patent No.: US 12,500,335 B2
(45) Date of Patent: Dec. 16, 2025

(54) ANTENNA MODULE AND COMMUNICATION DEVICE MOUNTING SAME, DIELECTRIC SUBSTRATE, AND MANUFACTURING METHOD OF ANTENNA MODULE

(71) Applicant: Murata Manufacturing Co., Ltd., Nagaokakyo (JP)

(72) Inventors: Sho Suzuki, Nagaokakyo (JP); Kengo Onaka, Nagaokakyo (JP); Hideyuki Taguchi, Nagaokakyo (JP); Shun Sakaida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 57 days.

(21) Appl. No.: 18/647,185

(22) Filed: Apr. 26, 2024

(65) Prior Publication Data

US 2024/0275034 A1 Aug. 15, 2024

Related U.S. Application Data

(63) Continuation of application No. PCT/JP2022/037406, filed on Oct. 6, 2022.

(30) Foreign Application Priority Data

Oct. 27, 2021 (JP) ................................ 2021-175678

(51) Int. Cl.

*H01Q 1/38* (2006.01)
*H01Q 1/24* (2006.01)
(Continued)

(52) U.S. Cl.

CPC ............... *H01Q 1/38* (2013.01); *H01Q 1/243* (2013.01); *H01Q 21/0087* (2013.01); *H01Q 21/06* (2013.01)

(58) Field of Classification Search

CPC ...... H01Q 1/38; H01Q 1/243; H01Q 21/0087; H01Q 21/06
See application file for complete search history.

(56) References Cited

FOREIGN PATENT DOCUMENTS

| | | | |
|---|---|---|---|
| JP | S56-154643 | A | 11/1981 |
| JP | 2006-105599 | A | 4/2006 |

(Continued)

OTHER PUBLICATIONS

International Search Report and Written Opinion mailed on Dec. 20, 2022, received for International Application No. PCT/JP2022/037406, filed on Oct. 6, 2022, 9 pages including English Translation.

*Primary Examiner* — Graham P Smith
(74) *Attorney, Agent, or Firm* — XSENSUS LLP

(57) ABSTRACT

An antenna module includes a dielectric substrate and a radiating element disposed on the dielectric substrate. The dielectric substrate includes first and second flat portions with different normal directions, and a bending portion that connects the first flat portion and the second flat portion. The bending portion has a bending region having a curvature. The first and second flat portions have a straight region having no curvature. The radiating element is disposed in the first flat portion. In a Raman spectrum obtained by Raman scattering spectroscopic analysis of a cross section of the dielectric substrate, a wave number difference indicating a difference between a wave number which is a mode value in the straight region and a wave number which is a mode value in the bending region is 0.1 $cm^{-1}$ or more.

20 Claims, 15 Drawing Sheets

(51) Int. Cl.

| | |
|---|---|
| ***H01Q 21/00*** | (2006.01) |
| ***H01Q 21/06*** | (2006.01) |

(56) References Cited

FOREIGN PATENT DOCUMENTS

| | | | |
|---|---|---|---|
| WO | 2015/109144 | A1 | 7/2015 |
| WO | 2020/170722 | A1 | 8/2020 |
| WO | 2021/059693 | A1 | 4/2021 |

CARBONYL GROUP

| STRAIGHT REGION (RG1) | BEFORE ANNEALING TREATMENT | AFTER ANNEALING TREATMENT |
|---|---|---|
| STRESS DISTRIBUTION |   |   |
| WAVE NUMBER DIFFERENCE | 0. 05 [cm$^{-1}$] | |

CARBONYL GROUP

BENZENE RING

ANTENNA MODULE AND COMMUNICATION DEVICE MOUNTING SAME, DIELECTRIC SUBSTRATE, AND MANUFACTURING METHOD OF ANTENNA MODULE

CROSS-REFERENCE TO RELATED APPLICATIONS

This application is a continuation of international application no. PCT/JP2022/037406, filed Oct. 6, 2022, and which claims the benefit of priority to Japanese application no. 2021-175678, filed Oct. 27, 2021. The entire contents of both prior applications are hereby incorporated by reference in their entirety.

TECHNICAL FIELD

The present disclosure relates to an antenna module, a communication device mounting the same, a dielectric substrate, and a manufacturing method of the antenna module, and more specifically, relates to a technique for preventing deformation of a dielectric substrate during the manufacturing process of the antenna module capable of radiating radio waves in two directions.

BACKGROUND ART

A configuration of an antenna module includes radiating elements disposed at flat portions in different normal directions from each other in a bent dielectric substrate.

CITATION LIST

Patent Document

Patent Document 1: International Publication No. 2020/170722

SUMMARY

Technical Problem

In the configuration of the antenna module described above, in a case where the dielectric substrate is formed of a resin, a dielectric layer on which the resin material is laminated is bent from a flat state at room temperature, and then heat-treated and fired to be pressure-bonded and fixed.

Here, when the resin material is bent at room temperature, a residual stress having a non-uniform distribution is generated in a bending portion. In this state, when the dielectric substrate is heated due to an increase in ambient temperature in actual use or an increase in temperature of the attached IC circuit, the residual stress is released as the temperature rises due to the influence of residual stress and deformation occurs. As a result, the bending angle of the bending portion may be wider than the desired angle. Then, since the direction of the radiated radio waves is shifted from the design direction, this can be a factor in a deterioration of the antenna characteristics such as directivity.

The present disclosure is made to solve such a problem by, for example, suppressing deterioration in antenna characteristics due to deformation of a dielectric substrate in a manufacturing process in an antenna module.

Solution to Problem

An antenna module according to a first aspect of the present disclosure includes a dielectric substrate and a radiating element disposed on the dielectric substrate. The dielectric substrate includes a first flat portion and a second flat with a normal direction different from a normal direction of the first flat portion, and a bending portion that connects the first flat portion and the second flat portion. The bending portion has a bending region having a curvature. The first flat portion and the second flat portion have a straight region having no curvature. The radiating element is disposed in the first flat portion. In a Raman spectrum obtained by Raman scattering spectroscopic analysis of a cross section of the dielectric substrate, a wave number difference indicating a difference between a wave number which is a mode value in the straight region and a wave number which is a mode value in the bending region is 0.1 $cm^{-1}$ or more.

A manufacturing method of an antenna module according to a second aspect of the present disclosure includes (disposing a radiating element on a dielectric substrate, bending the dielectric substrate, and performing an annealing treatment in a state where the dielectric substrate is held in a holding tool configured to fix a shape of the bent dielectric substrate.

Advantageous Effects

In the antenna module and the manufacturing method thereof according to the present disclosure, after the dielectric substrate is bent, the annealing treatment is applied in a state where the dielectric substrate is held in the holding tool. Therefore, in the results of the Raman scattering spectroscopic analysis of the cross section of the dielectric substrate, the difference (wave number difference) between the wave number which is the mode value of Raman light (Raman spectrum) in the bending region and the wave number which is the mode value of Raman light in the straight region is 0.1 $cm^{-1}$ or more. That is, the stress difference of the residual stress in the bending portion is reduced. Therefore, deformation of the dielectric substrate in the manufacturing process is suppressed, so that deterioration in antenna characteristics can be suppressed.

DESCRIPTION OF EMBODIMENTS

Figure 1:
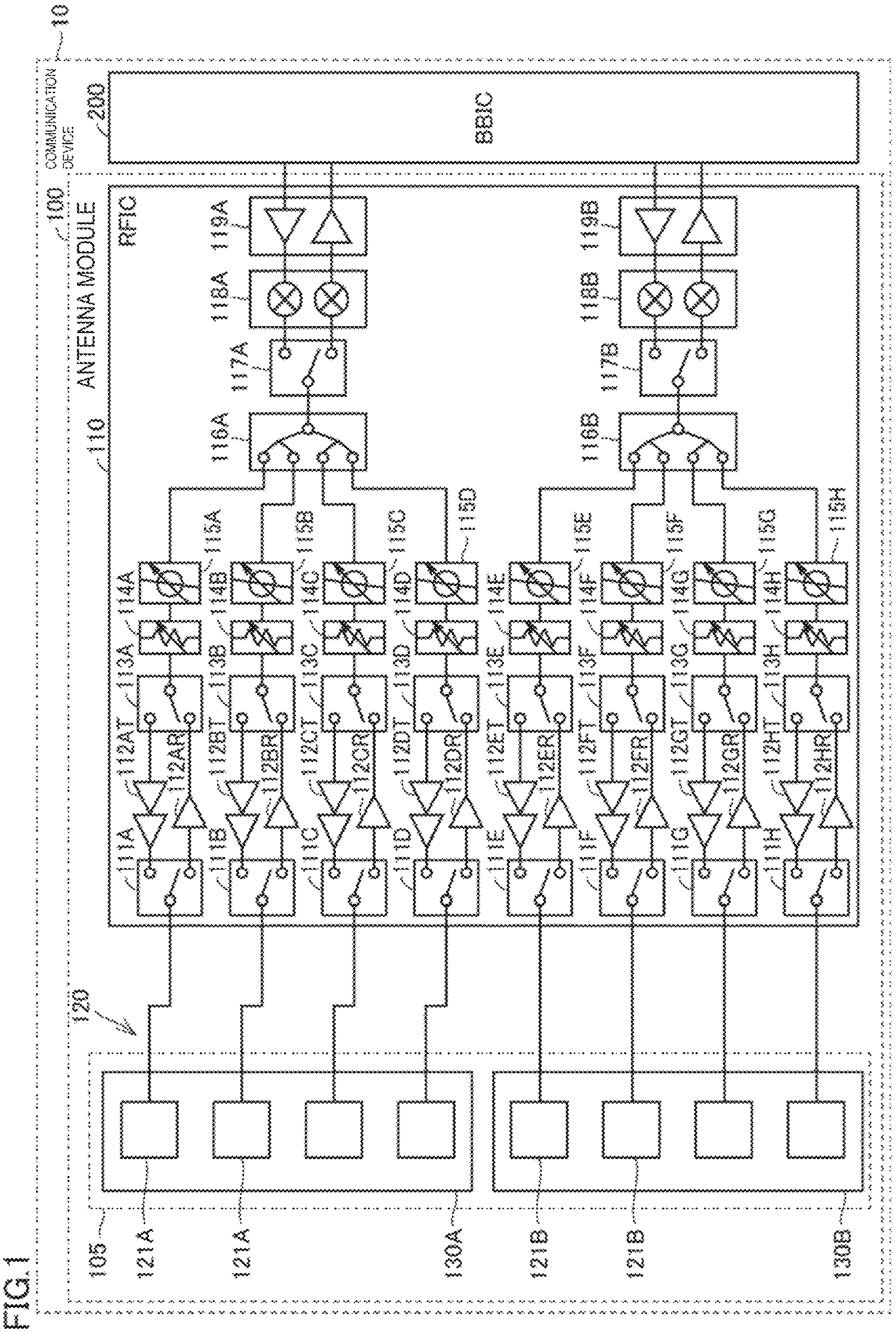
FIG. 1 is a block diagram of a communication device to which an antenna module according to an exemplary embodiment is applied.

Hereinafter, exemplary embodiments of the present disclosure will be described in detail with reference to the accompanying drawings. The same or corresponding portions in the drawings are denoted by the same reference numerals, and the description is not repeated.

[Basic Configuration of Communication Device]

FIG. 1 is a block diagram of a communication device 10 to which an antenna module 100 according to the present exemplary embodiment is applied. The communication device 10 is, for example, a mobile terminal such as a mobile phone, a smartphone, or a tablet, a personal computer having a communication function, or the like. An example of a frequency bandwidth of radio waves used in the antenna module 100 according to the present exemplary embodiment is, for example, a radio wave in a millimeter wave band having a center frequency of 28 GHz, 39 GHz, 60 GHz, or the like, but radio waves in frequency bandwidths other than the above-mentioned can be applied.

Referring to FIG. 1, the communication device 10 includes the antenna module 100 and a BBIC 200 that configures a baseband signal processing circuit. The antenna module 100 includes an RFIC 110 that is an example of a power supply circuit and an antenna device 120. The communication device 10 up-converts a signal transmitted from the BBIC 200 to the antenna module 100 to a high frequency signal and radiates the signal from the antenna device 120, and down-converts a high frequency signal received at the antenna device 120 and processes the signal at the BBIC 200.

The antenna device 120 includes a dielectric substrate 105 having two flat portions 130A and 130B. At least one radiating element is disposed in each flat portion of the dielectric substrate 105. More specifically, $m_1$ radiating elements 121A (first radiating elements) are disposed in the flat portion 130A, and $n_1$ radiating elements (second radiating elements) are disposed in the flat portion 130B ($m_1 \geq 1$, $n_1 \geq 1$). The number $m_1$ of the radiating elements 121A disposed in the flat portion 130A may be the same as or different from the number $n_1$ of the radiating elements 121B disposed in the flat portion 130B.

In FIG. 1, a configuration ($m_1=4$, $n_1=4$) in which four radiating elements 121A are disposed in the flat portion 130A and four radiating elements 121B are disposed in the flat portion 130B is illustrated as an example, but the number of radiating elements disposed in each flat portion is not limited thereto. In addition, in FIG. 1, an example in which the radiating elements are disposed in a one-dimensional array in a row in each flat portion of the dielectric substrate is illustrated, but the radiating elements may be disposed in a two-dimensional array in each flat portion. In the present exemplary embodiment, the radiating elements 121A and 121B are microstrip antennas having a substantially square flat plate shape.

The RFIC 110 includes switches 111A to 111H, 113A to 113H, 117A, and 117B, power amplifiers 112AT to 112HT, low noise amplifiers 112AR to 112HR, attenuators 114A to 114H, phase shifters 115A to 115H, signal synthesizer/distributors 116A and 116B, mixers 118A and 118B, and amplifier circuits 119A and 119B. Of these, the configuration of the switches 111A to 111D, 113A to 113D, and 117A, the power amplifiers 112AT to 112DT, the low noise amplifiers 112AR to 112DR, the attenuators 114A to 114D, the phase shifters 115A to 115D, the signal synthesizer/distributor 116A, the mixer 118A, and the amplifier circuit 119A is a circuit for a high frequency signal radiated from the radiating element 121A of the flat portion 130A. In addition, the configuration of the switches 111E to 111H, 113E to 113H, and 117B, the power amplifiers 112ET to 112HT, the low noise amplifiers 112ER to 112HR, the attenuators 114E to 114H, the phase shifters 115E to 115H, the signal synthesizer/distributor 116B, the mixer 118B, and the amplifier circuit 119B is a circuit for a high frequency signal radiated from the radiating element 121B of the flat portion 130B.

In a case where the high frequency signal is transmitted, the switches 111A to 111H and 113A to 113H are switched to the power amplifier 112AT to 112HT side, and the switches 117A and 117B are connected to the transmission side amplifiers of the amplifier circuits 119A and 119B. In a case where the high frequency signal is received, the switches 111A to 111H and 113A to 113H are switched to the low noise amplifier 112AR to 112HR side, and the switches 117A and 117B are connected to the receiving side amplifiers of the amplifier circuits 119A and 119B.

The signal transmitted from the BBIC 200 is amplified by the amplifier circuits 119A and 119B and up-converted by the mixers 118A and 118B. The transmission signal, which is an up-converted high frequency signal, is divided into four waves by the signal synthesizer/distributors 116A and 116B, passes through the corresponding signal paths, and is fed to different radiating elements 121A and 121B, respectively. By individually adjusting the phase shift degrees of the phase shifters 115A to 115H disposed in each signal path, the directivity of the radio wave output from the radiating element of each flat portion can be adjusted.

The received signal, which is the high frequency signal received by each of the radiating elements 121A and 121B, is transmitted to the RFIC 110, passes through four different signal paths, and is multiplexed in the signal synthesizer/distributors 116A and 116B. The multiplexed received signal is down-converted by the mixers 118A and 118B, amplified by the amplifier circuits 119A and 119B, and transmitted to the BBIC 200.

The RFIC 110 is formed as, for example, a one-chip integrated circuit component including the above-described circuit configuration. Alternatively, the device (switch, power amplifier, low noise amplifier, attenuator, and phase shifter) corresponding to each of the radiating elements 121A and 121B in the RFIC 110 may be formed as a one-chip integrated circuit component for each of the corresponding radiating elements.

[Configuration of Antenna Module]

Figure 2:
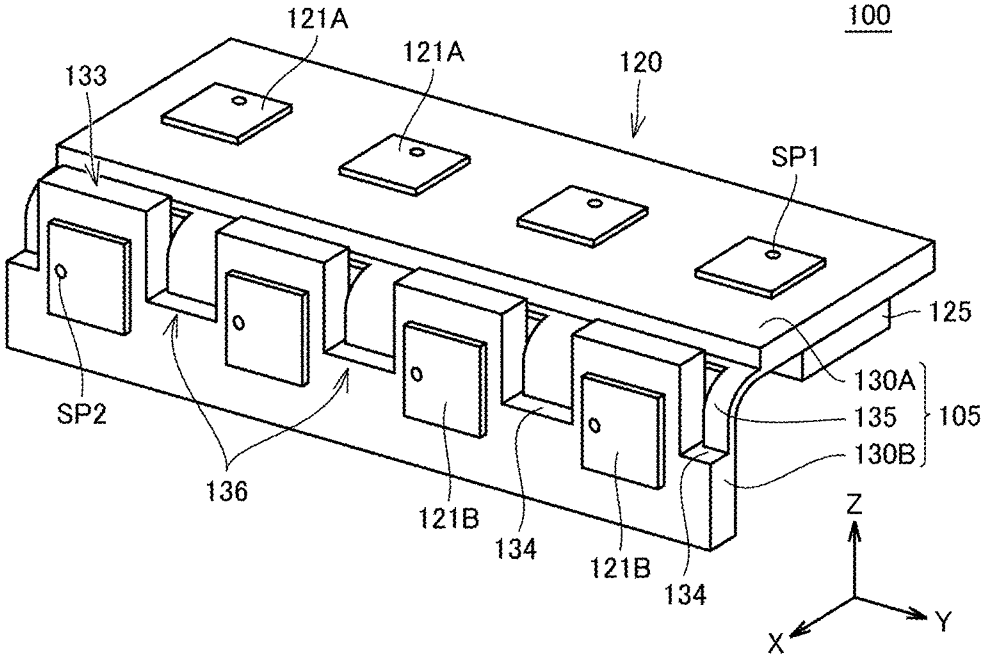
FIG. 2 is a perspective view of the antenna module according to the exemplary embodiment.

Next, the details of the configuration of the antenna module 100 according to the present exemplary embodiment will be described with reference to FIGS. 2 and 3. FIG. 2 is a perspective view of the antenna module 100. In addition, FIG. 3 is a cross-sectional view of a state where the antenna module 100 is mounted on the mounting substrate 20.

Figure 3:
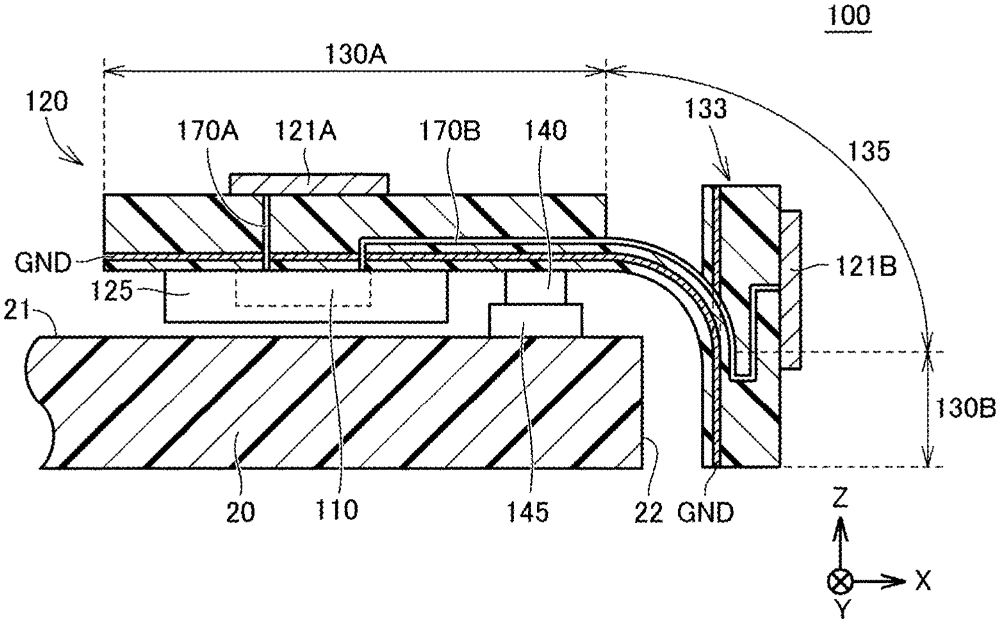
FIG. 3 is a cross-sectional view of the antenna module according to the exemplary embodiment.

Referring to FIGS. 2 and 3, the antenna module 100 includes a connector 140, power supply wirings 170A and 170B, and a ground electrode GND, in addition to the dielectric substrate 105, the radiating elements 121A and 121B, and the RFIC 110. In the following description, the normal direction of the flat portion 130A is defined as a Z axis direction, the normal direction of the flat portion 130B is defined as an X axis direction, and the arrangement direction of the radiating elements in each flat portion is defined as a Y axis direction. A positive direction of the Z axis in each drawing may be referred to as an upper surface side, and a negative direction may be referred to as a lower surface side.

For example, the dielectric substrate 105 is a multilayer resin substrate formed by laminating a plurality of resin layers made of a resin such as epoxy or polyimide, a multilayer resin substrate formed by laminating a plurality of resin layers made of liquid crystal polymer (LCP) having a lower dielectric constant, and a multilayer resin substrate formed by laminating a plurality of resin layers made of fluorine resin. The dielectric substrate 105 need not necessarily have a multilayer structure, and may be a single layer substrate.

In the antenna device 120 of the antenna module 100, the dielectric substrate 105 has a substantially L-shaped cross-sectional shape, and includes a flat plate-like flat portion 130A having the Z axis direction in FIGS. 2 and 3 as a normal direction, a flat plate-like flat portion 130B having the X axis direction in FIGS. 2 and 3 as a normal direction, and a bending portion 135 that connects the two flat portions 130A and 130B. In the exemplary embodiment, the flat portion 130A corresponds to the "first flat portion" of the present disclosure, and the flat portion 130B corresponds to the "second flat portion" of the present disclosure.

In the antenna module 100, four radiating elements are disposed in a row in the Y axis direction in each of the two flat portions 130A and 130B. In the following description, to make it easy to understand, an example in which the radiating elements 121A and 121B are disposed so as to be exposed on the surfaces of the flat portions 130A and 130B will be described, but the radiating elements 121A and 121B may be disposed inside the substrate of the flat portion 130A and 130B.

The flat portion 130A has a substantially rectangular shape, and four radiating elements 121A are disposed in a row on the surface thereof. In addition, a system in package (SiP) module 125 having a built-in RFIC 110, a power module IC, and the like, and the connector 140 are connected to the lower surface side (the surface in the negative direction of the Z axis) of the flat portion 130A. The flat portion 130A is mounted on the mounting substrate 20 by connecting the connector 140 to a connector 145 disposed on the surface 21 of the mounting substrate 20. The flat portion 130A may be mounted on the mounting substrate 20 by solder connection.

The flat portion 130B is connected to the bending portion 135 bent from the flat portion 130A, and is disposed so that the surface on the inner side portion thereof (the surface in the negative direction of the X axis) faces the side surface 22 of the mounting substrate 20. The flat portion 130B has a configuration in which a plurality of notched portions 136 are formed on a substantially rectangular dielectric substrate, and the bending portion 135 is connected to the notched portions 136. In other words, at the portion of the flat portion 130B where the notched portion 136 is not formed, a protrusion portion 133 is formed that protrudes from the boundary portion 134 where the bending portion 135 and the flat portion 130B are connected in a direction toward the flat portion 130A (that is, the positive direction of Z axis) along the flat portion 130B. The position of the protruding end of the protrusion portion 133 is located in the positive direction of the Z axis with respect to the surface of the lower surface side (the side that faces the mounting substrate 20) of the flat portion 130A.

The flat portion 130B in the antenna module 100 of FIG. 2 is formed with four protrusion portions 133 corresponding to the four radiating elements 121A disposed on the flat portion 130A. One radiating element 121B is disposed for each of the protrusion portions 133. Each of the radiating elements 121B in the flat portion 130B is disposed so that at least a part thereof overlaps the protrusion portion 133.

The ground electrode GND is disposed on the inner layer of the surface that faces the mounting substrate 20 in the flat portions 130A and 130B and the bending portion 135. The high frequency signal is transmitted from the RFIC 110 in the SiP module 125 to the radiating element 121A of the flat portion 130A via the power supply wiring 170A. In addition, the high frequency signal is transmitted from the RFIC 110 to the radiating element 121B of the flat portion 130B via the power supply wiring 170B. The power supply wiring 170B is connected from the RFIC 110 to the radiating element 121B disposed in the flat portion 130B through the inside of each of the dielectric substrates of the flat portions 130A and 130B and the inside of the dielectric substrate of the bending portion 135.

[Deformation of Dielectric Substrate in Manufacturing Step]

Figure 4:
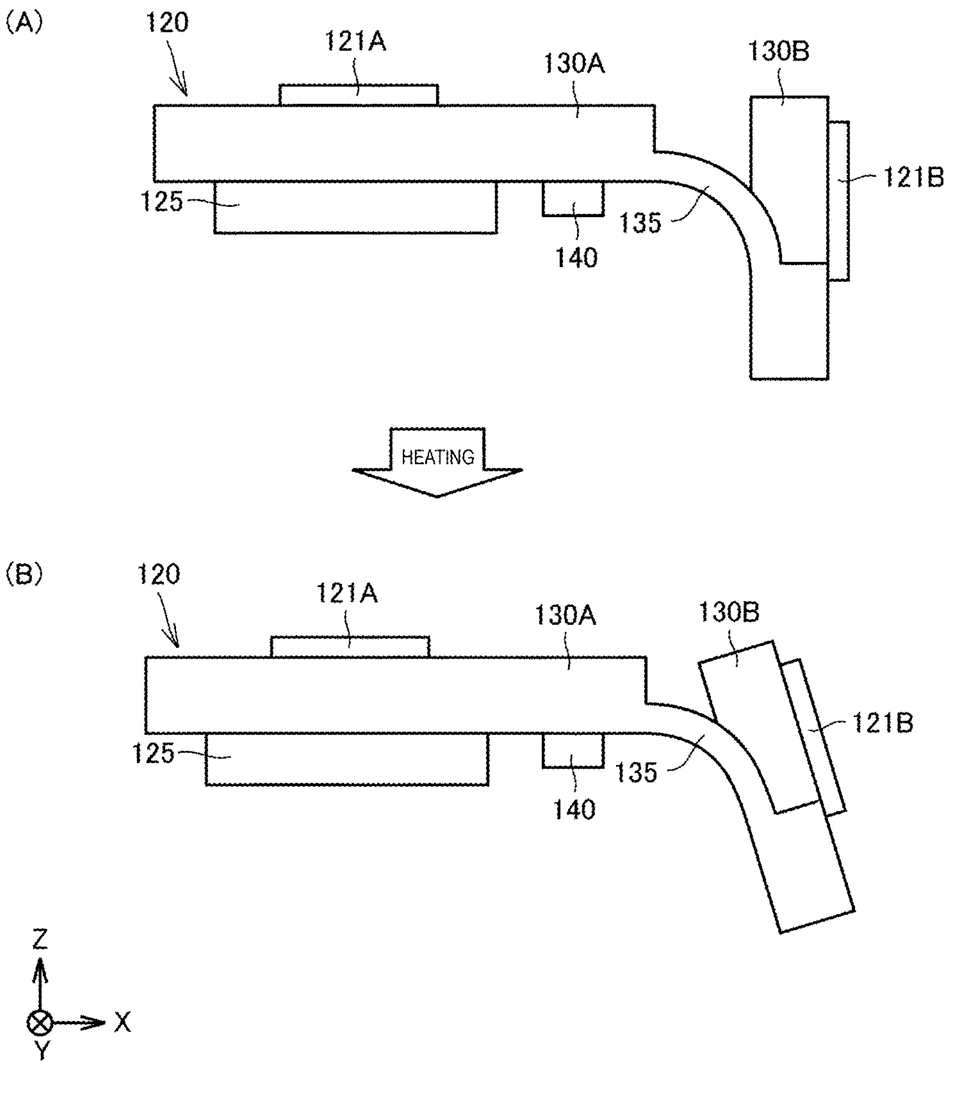
FIG. 4 is a diagram illustrating deformation of a dielectric substrate that occurs in a manufacturing process.

As described above, in the antenna module in which the dielectric substrate is bent to form the two flat portions and radiates radio waves in two directions, residual stress is generated in the bending portion due to the bending of the dielectric substrate. In a case where ceramic is employed as the dielectric substrate, after the bending step, a heat treatment is applied to pressure-bonded and fire the ceramic. At this time, when there is residual stress in the bending portion, the residual stress is released when the bending portion is heated, and a force that tries to return to the shape before bending is generated. For example, in a case where the angle of the flat portion 130B with respect to the flat portion 130A in the bending process is set to 90° as illustrated in FIG. 4(A), when heated in this state, a force that tries to return to the state before bending acts, and illustrated in FIG. 4(B), the angle between the flat portion 130A and the flat portion 130B is deformed to be larger than 90°.

When such deformation occurs due to heating, the radiation direction of the radio wave radiated from the radiating element 121B disposed on the flat portion 130B is shifted from the radiation direction at the time of design, and there is a possibility that antenna characteristics may deteriorate, such as deterioration of directivity and antenna gain, and interference with radio waves radiated from the radiating element 121A of the flat portion 130A.

In the present exemplary embodiment, in the manufacturing process of the antenna module, after the dielectric substrate is bent, the annealing treatment is applied in a state where the shape of the dielectric substrate is constrained, so that the residual stress at the bending portion is released while the shape of the dielectric substrate is maintained. As a result, even in a case where the heat treatment is applied in subsequent manufacturing steps, deformation due to the residual stress of the bending portion can be suppressed.

[Description of Manufacturing Process]

Figure 5:
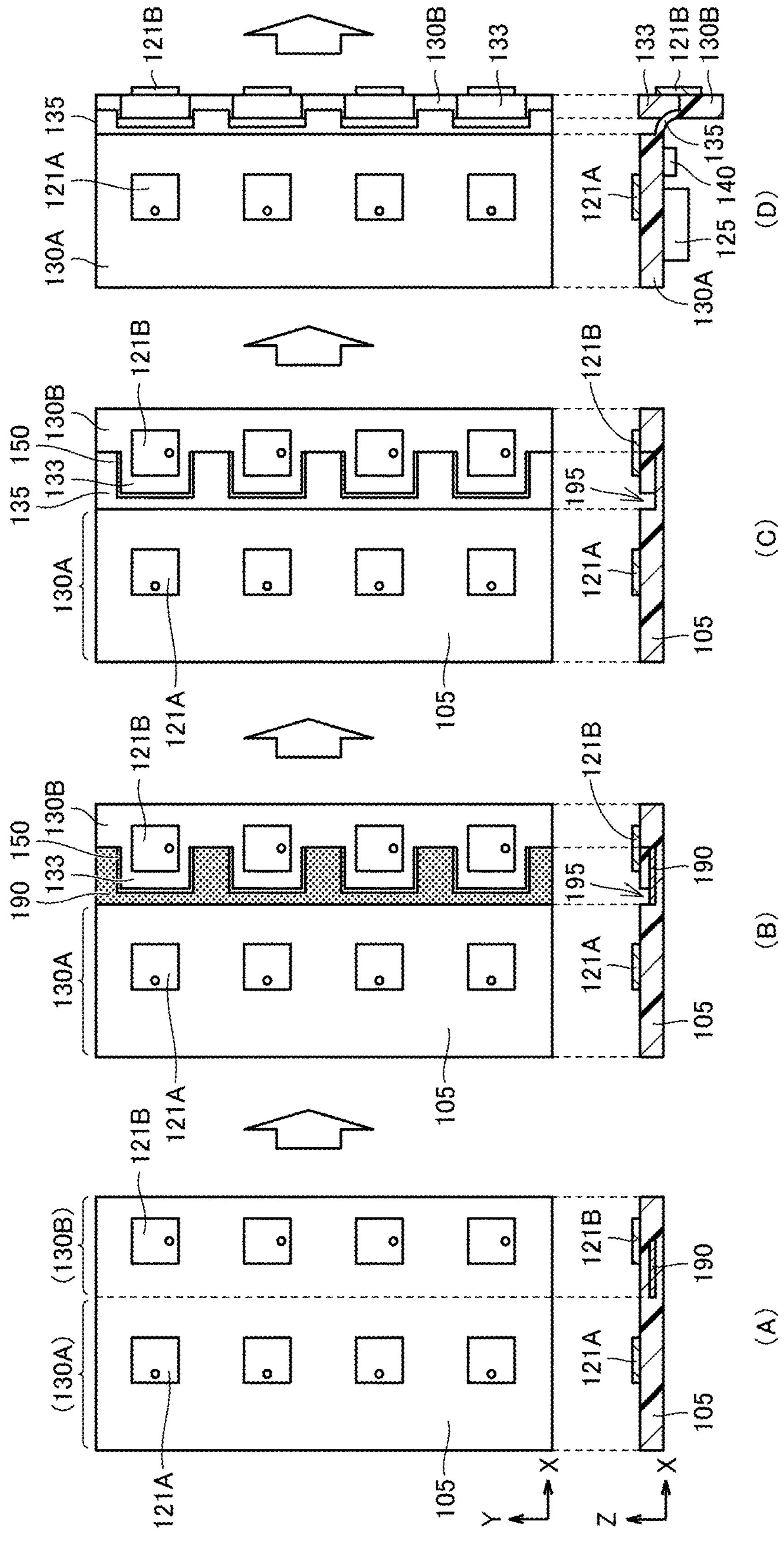
FIG. 5 is a first diagram illustrating a manufacturing process of the antenna module according to the exemplary embodiment.
Figure 6:
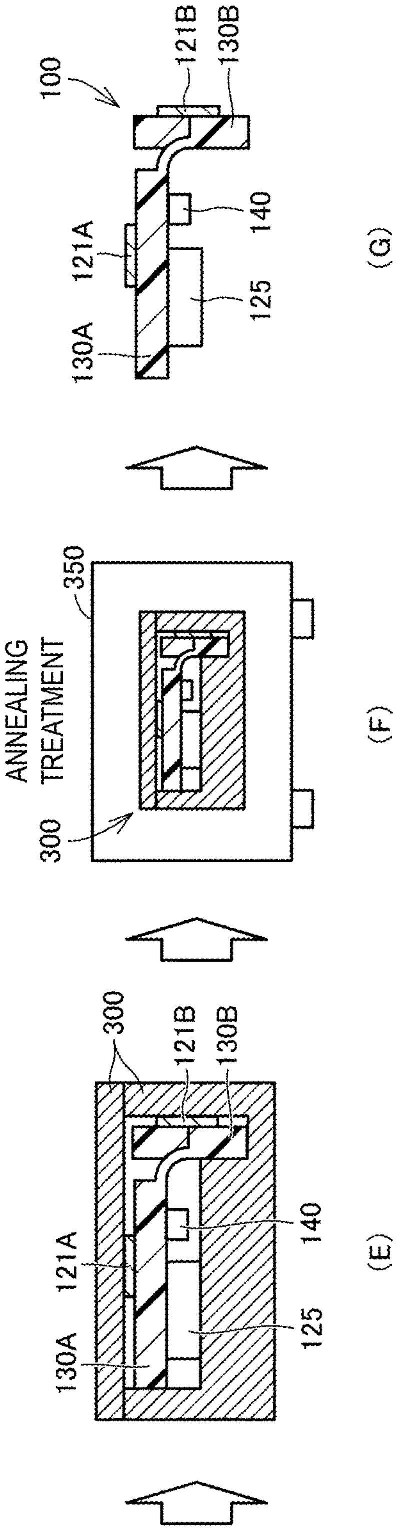
FIG. 6 is a second diagram illustrating a manufacturing process of the antenna module according to the exemplary embodiment.

Next, a specific manufacturing process of the antenna module 100 according to the present exemplary embodiment will be described with reference to FIGS. 5 and 6. In the manufacturing process, the steps are progressed in the order of FIGS. 5(A) to 5(D), and the steps are further progressed in the order of FIGS. 6(E) to 6(G). In each step of FIG. 5, a plan view when viewed from the normal direction (that is, Z axis direction) of the dielectric substrate 105 is illustrated in the upper stage, and a cross-sectional view when viewed from the Y axis direction is illustrated in the lower stage. In addition, in each step in FIG. 6, a cross-sectional view when viewed from the Y axis direction is illustrated.

First, in the step illustrated in FIG. 5(A), the dielectric substrate 105 is formed by laminating a plurality of dielectric layers in which a dielectric and a metal film formed in a desired pattern are bonded to each other. The metal films of each dielectric layer form the radiating elements 121A and 121B, the power supply wiring 170A and 170B, the ground electrode GND, and the like. At this time, an electrode 190 having the same shape as the bending portion 135 is formed on the inner layer of the portion which is the flat portion 130B of the dielectric substrate 105.

Next, in the step illustrated in FIG. 5(B), the dielectric at the portion forming the bending portion 135 is removed by laser processing or router processing, and a recessed portion 195 is formed in the dielectric substrate 105. At this time, only the dielectric above the electrode 190 described above is removed. For example, during laser processing, the electrode 190 functions as a guard electrode for blocking the laser during laser processing. As a result, in a case where the dielectric substrate 105 is viewed in plan view, the electrode 190 is exposed. The desired thickness of the bending portion 135 is ensured by the electrode 190. The electrode 190 is not necessarily required for router processing. The power supply wiring 170B and the ground electrode GND reaching the flat portion 130B are formed in a layer on the lower surface side of the electrode 190.

At the boundary portion between the portion which is the protrusion portion 133 and the portion which is the bending portion 135, a slit 150 that penetrates the dielectric substrate 105 in the thickness direction is formed by laser processing or router processing. The electrode 190 is not formed at the portion where the slit 150 is formed.

Thereafter, in the step illustrated in FIG. 5(C), the exposed electrode 190 is removed by the etching treatment being applied. In a case where the radiating element 121 is disposed on the surface of the dielectric substrate 105, the masking treatment with a resist or the like is applied to the portion of the radiating element 121 prior to the etching treatment. In a case where the electrode 190 is not required, as in router processing, the step in FIG. 5(C) is omitted.

In the step illustrated in FIG. 5(D), the dielectric substrate 105 is bent along the Y axis at the bending portion 135 by using, for example, a mold (not illustrated). As a result, the normal line of the flat portion 130B is oriented in the X axis direction. At this time, since the slit 150 is formed, a part of the dielectric substrate rises from the surface of the bending portion 135, the protrusion portion 133 is formed, and at least a part of the radiating element 121B is disposed in the protrusion portion 133. The SiP module 125 and the connector 140 are mounted on the lower surface side of the flat portion 130A. After the SiP module 125 is mounted on the dielectric substrate 105, the dielectric substrate 105 may be bent.

Next, in the step illustrated in FIG. 6(E), the antenna module 100 formed in FIG. 5(D) is disposed in a holding tool 300 configured to fix the shape of the bent dielectric substrate 105. The mold used to bend the dielectric substrate 105 in FIG. 5(D) may be used as the holding tool 300 as it is. In the step illustrated in FIG. 6(F), the annealing treatment is applied by a heating device 350 such as an oven in a state where the dielectric substrate 105 is held by the holding tool 300. The annealing treatment is performed by, for example, heating in an atmosphere of 150° C. for 60 minutes. By the annealing treatment, the stress difference of the stress generated in the bending portion 135 of the dielectric substrate 105 by the bending step is reduced. The conditions of temperature and time in the annealing treatment may be conditions other than the above.

In the step illustrated in FIG. 6(F), the antenna module 100 is taken out from the holding tool 300.

As described above, after the dielectric substrate 105 is bent, the annealing treatment is applied in a state of constraining the dielectric substrate 105, so that the stress difference generated in the bending portion 135 is reduced and the stress distribution becomes uniform. Therefore, deformation of the bending portion 135 that occurs in the subsequent heat treatment can be suppressed. Therefore, the shift of the radiation direction of the radiating element 121B disposed in the flat portion 130B from the radiation direction at the time of design is reduced, so that deterioration in the antenna characteristics can be suppressed.

For example, in the example in which the annealing treatment is performed under the above conditions, the opening angle (return angle) of the bending portion 135 after the annealing treatment with respect to before the annealing treatment is less than 10°.

[Raman Scattering Spectroscopic Analysis]

The stress distribution of the bending portion 135 can be confirmed by performing Raman scattering spectroscopic analysis. The Raman scattering spectroscopic analysis is a method of evaluating a material by using light having a different vibration (Raman scattered light) from the incident light that is generated according to the structure of the material when the material is irradiated with light. In a case where a stress distribution occurs in a material, the Raman scattered light generated by a change in the intermolecular structure of the material due to the difference in stress is shifted. Therefore, the state of the generated stress can be detected by detecting the wave number (reciprocal of the wavelength) at which the peak of the spectrum of the Raman scattered light occurs.

Figure 7:
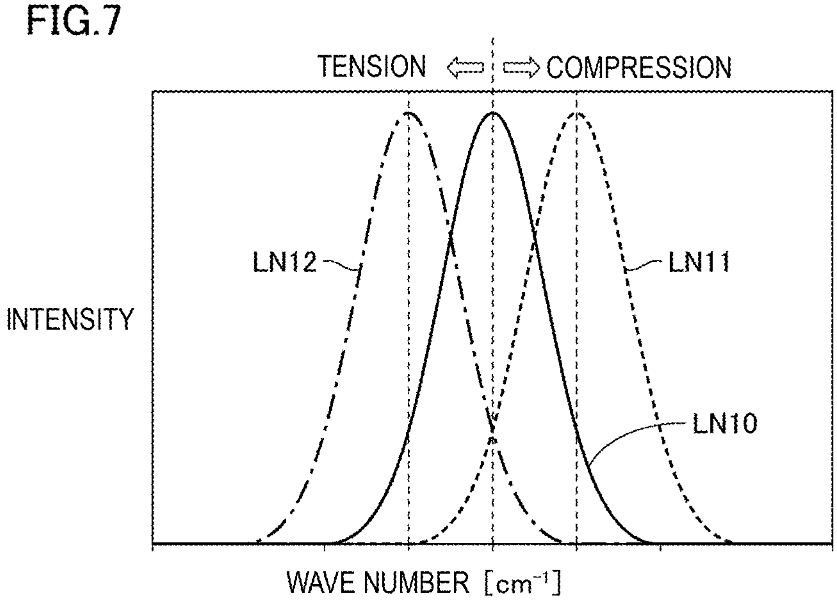
FIG. 7 is a graph illustrating a stress/strain evaluation method by Raman scattering spectroscopic analysis.

FIG. 7 is a graph illustrating an example of a shift of a Raman spectrum caused by a difference in stress. In FIG. 7, in a case where the Raman spectrum in a state where no stress acts on a certain material (or the basic state of the material) is defined as a solid line LN10, when the compressive stress acts on the material, the Raman spectrum shifts in the direction where the wave number increases, as a broken line LN11. On the other hand, when the tensile stress acts on the material, the Raman spectrum shifts in a direction where the wave number decreases. Since the wave number of the Raman spectrum differs depending on the type of chemical coupling of the material, by focusing on the shift direction and shift amount of the Raman spectrum for a specific chemical coupling (for example, benzene ring, carbonyl group, and the like) contained in the material to be observed, it is possible to detect the stress distribution acting on the material.

Figure 8:
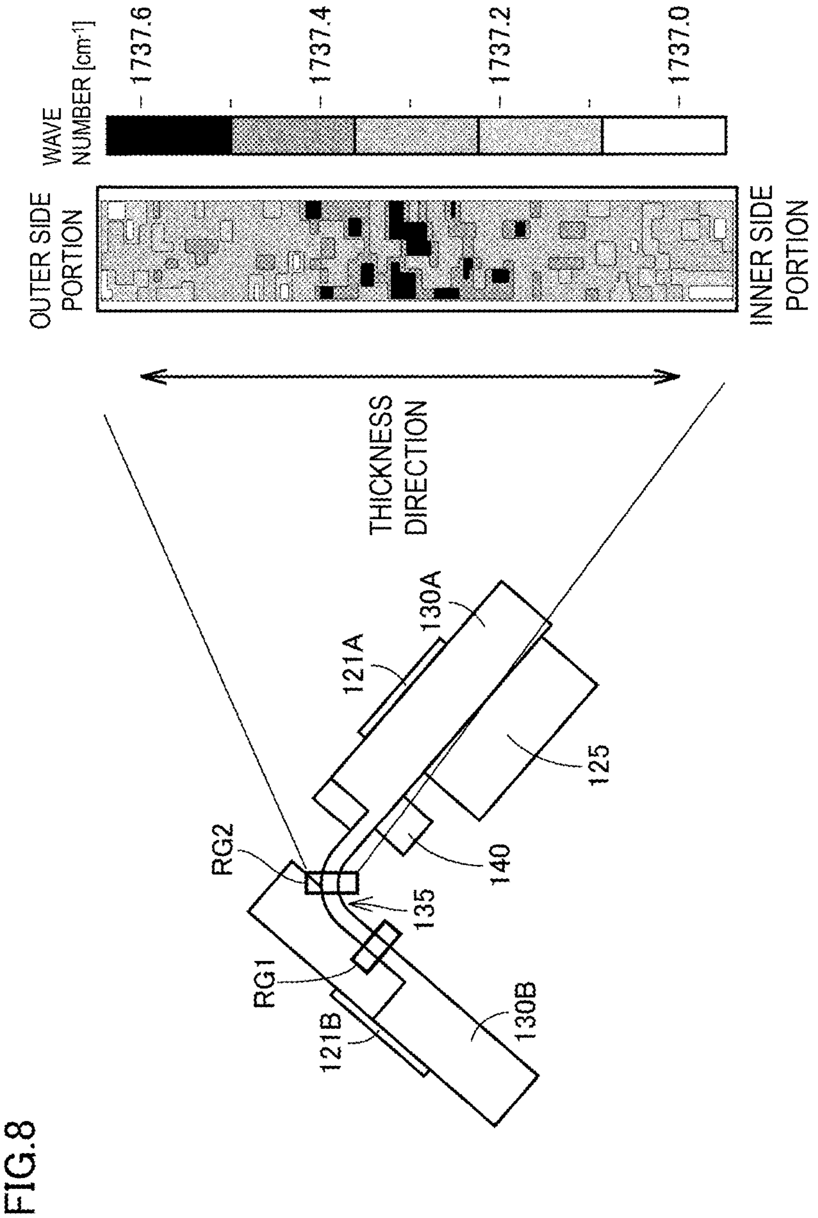
FIG. 8 is a diagram illustrating an example of a stress distribution by Raman scattering spectroscopic analysis.

FIG. 8 is a diagram illustrating an example of a stress distribution detected by Raman scattering spectroscopic analysis in the dielectric substrate 105 of the antenna module 100 not performed to the annealing treatment. FIG. 8 illustrates the stress distribution of a bending region RG2 having a curvature near the central portion of the bending portion 135 along a path from the flat portion 130A to the flat portion 130B. In the stress distribution diagram of FIG. 8, the vertical axis indicates the thickness direction of the bending portion 135, the upper side of the distribution diagram is the outer side portion of the bending portion, and the lower side of the distribution diagram is the inner side portion of the bending portion. In addition, the hatching density increases as the wave number increases (that is, the compressive stress increases), and the hatching density decreases as the wave number decreases (that is, the tensile stress increases). In the example of FIG. 8, the compressive stress increases near the center in the thickness direction, and the tensile stress increases on the surface side (outer side portion/inner side portion) of the bending portion 135.

In FIGS. 9 to 14 below, the stress distribution before and after the annealing treatment in the bending region RG2, which is a region having the curvature of the bending portion 135 (that is, a region on which stress due to bending acts), and the straight region RG1, which is a region without curvature of the flat portion (a region on which stress due to bending does not act), will be described. CPL is used for the dielectric substrate 105, and Raman scattering spectroscopic analysis is performed targeting a carbonyl group included in the CPL in FIGS. 9 to 14.

Figure 9:
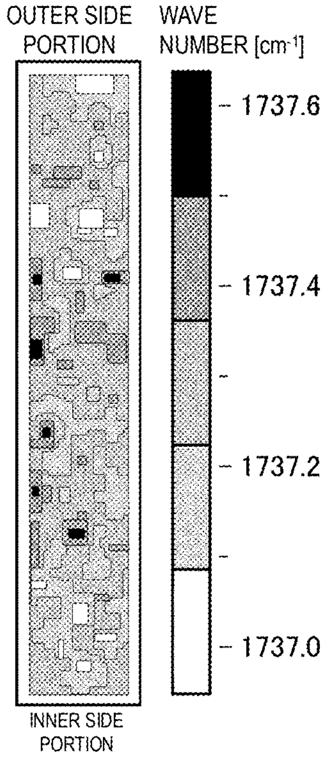
FIG. 9 is a diagram illustrating a comparison of stress distribution before and after an annealing treatment in a straight region of a carbonyl group.
Figure 9:
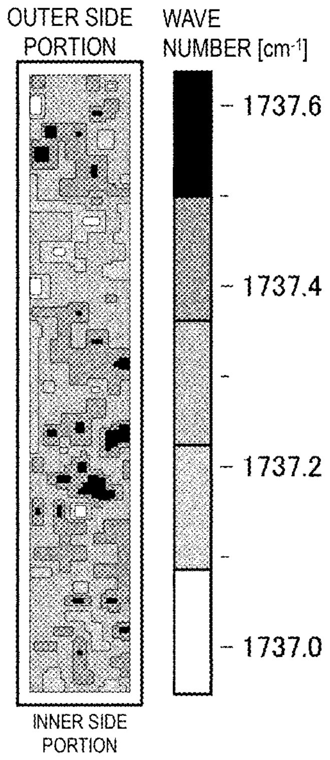
Figure 10:
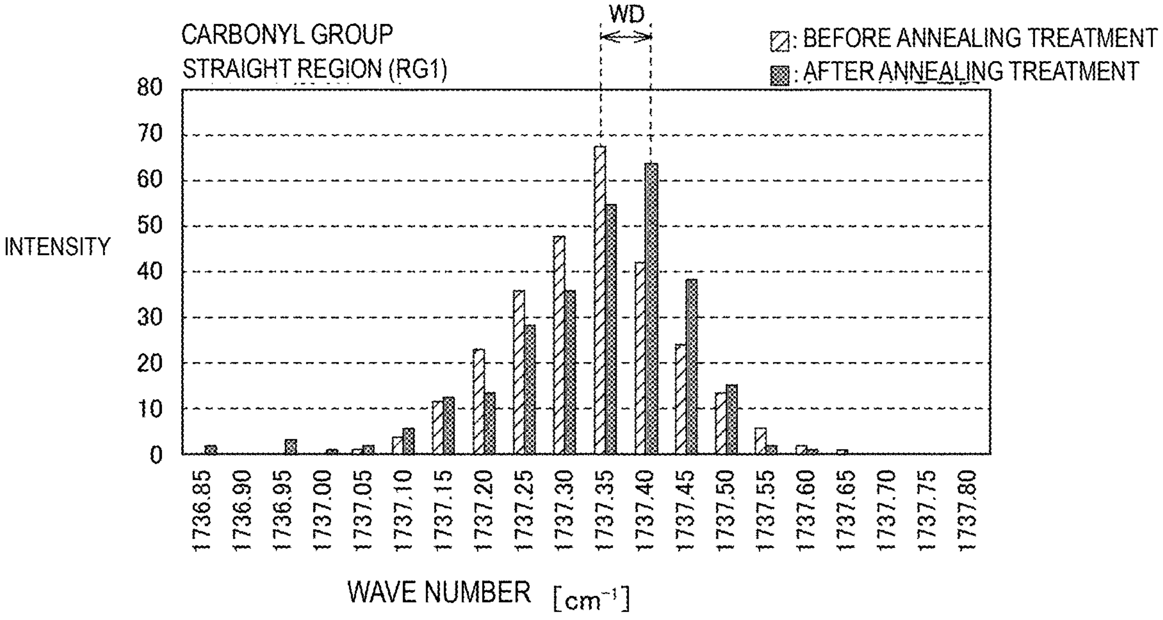
FIG. 10 is a graph illustrating a Raman spectrum in the case of FIG. 9.

FIG. 9 is a diagram comparing the stress distribution of the straight region RG1 before the annealing treatment and after the annealing treatment in the antenna module 100 illustrated in FIG. 8. In addition, FIG. 10 is a graph illustrating a wave number distribution of the Raman spectrum before the annealing treatment and after the annealing treatment. In FIG. 10 and FIGS. 12, 14, and 16, which will be described later, the horizontal axis indicates the wave number, and the vertical axis indicates the intensity of the spectrum (that is, the frequency of occurrence).

In the straight region RG1, since the residual stress due to the bending step is not generated, the stress distribution before and after the annealing treatment does not change significantly as illustrated in FIGS. 9 and 10.

Here, when the absolute value of the difference between the wave numbers which is the mode values of the intensity in the Raman spectrum is defined as a "wave number difference" WD, the wave number difference before and after the annealing treatment in the straight region RG1 is approximately 0.05 $cm^{-1}$. The mode value of the intensity in the Raman spectrum indicates the wave number which is a peak in the wave number distribution of the Raman spectrum illustrated in FIG. 10.

Figure 11:
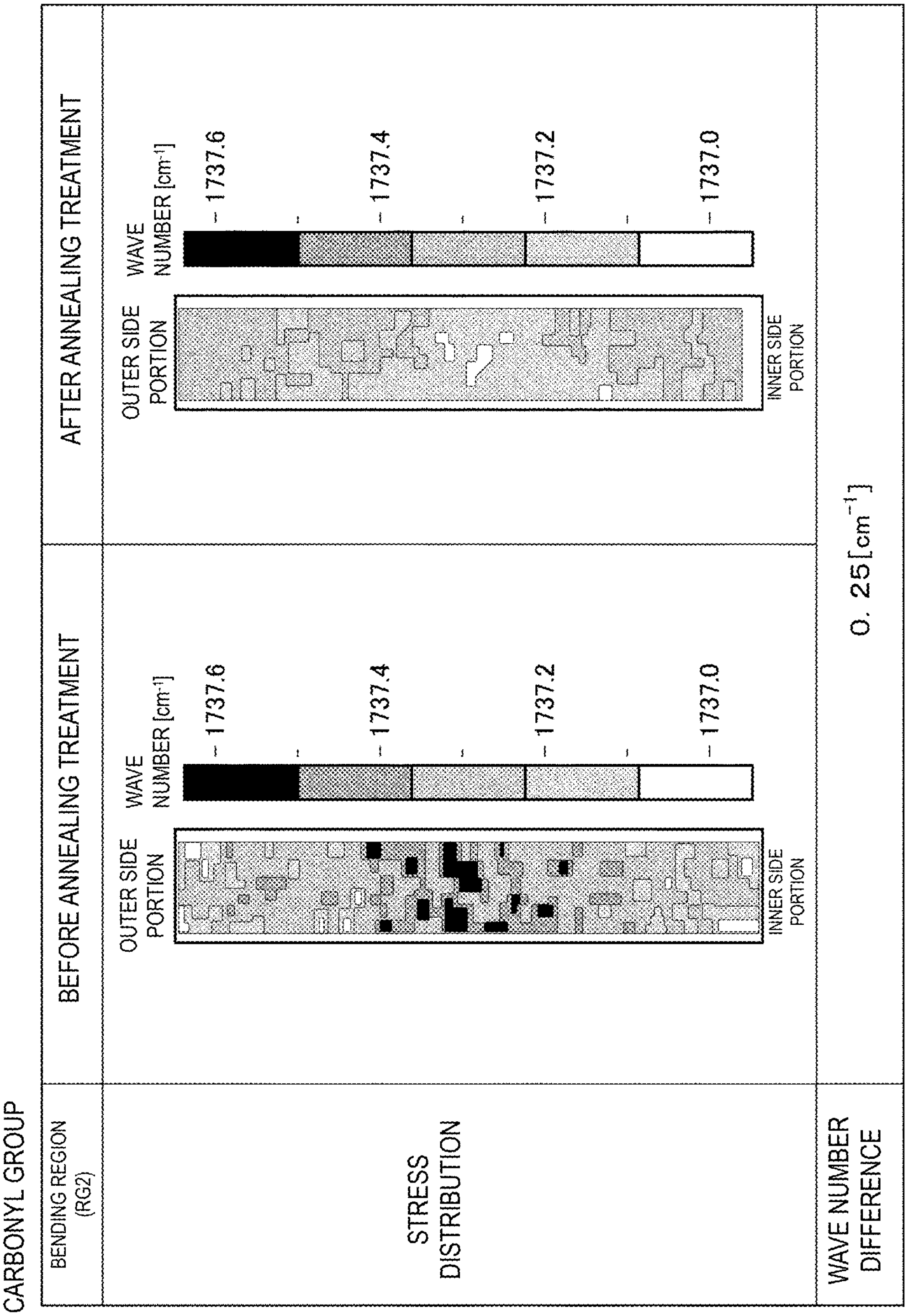
FIG. 11 is a diagram illustrating a comparison of stress distribution before and after an annealing treatment in a bending region of a carbonyl group.
Figure 12:
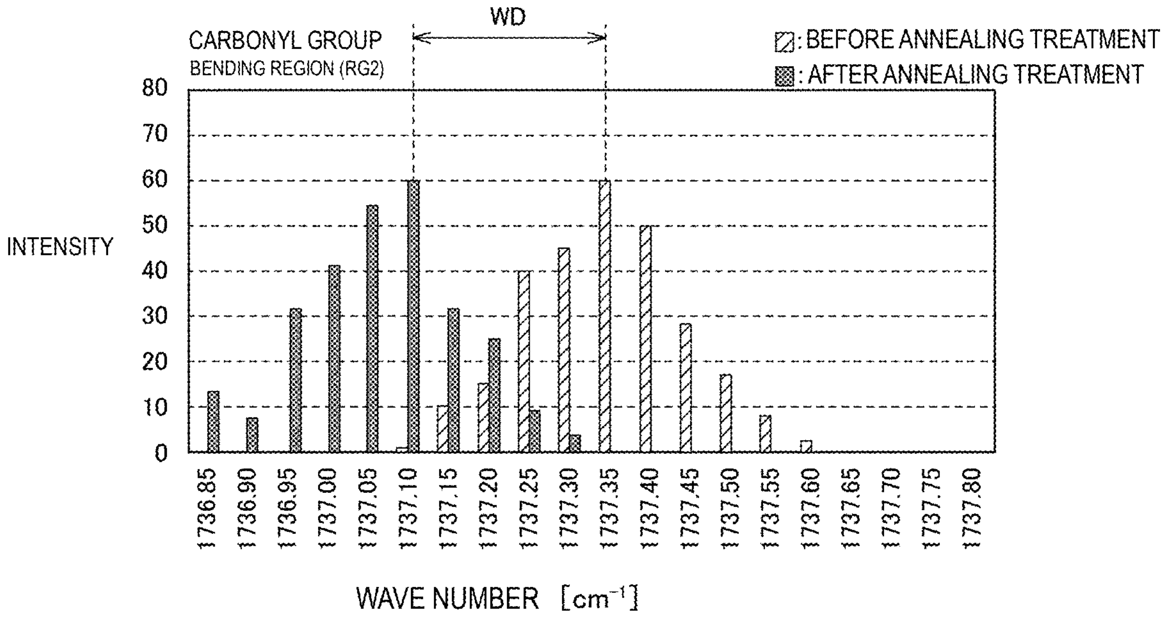
FIG. 12 is a graph illustrating a Raman spectrum in the case of FIG. 11.

FIGS. 11 and 12 are diagrams illustrating each of the stress distribution and the Raman spectrum of the bending region RG2 before the annealing treatment and after the annealing treatment. Referring to FIGS. 11 and 12, in the bending region RG2, the residual stress in the compressive direction is generated by the bending step near the center in the thickness direction. However, after the annealing treatment, the wave number is reduced throughout the thickness direction, and there is a substantially uniform stress distribution. In this case, the wave number difference WD before and after the annealing treatment is 0.25 $cm^{-1}$.

Figure 13:
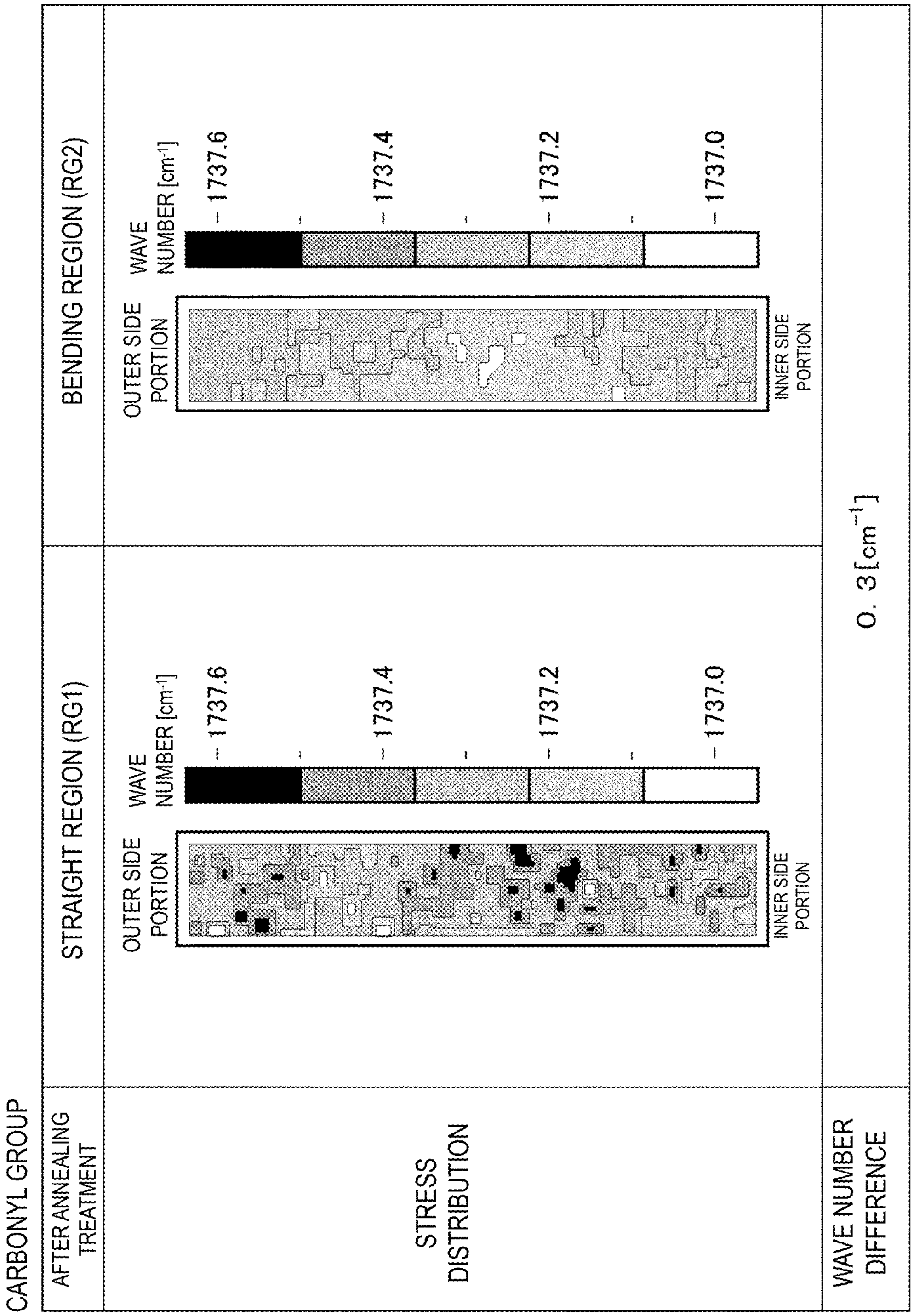
FIG. 13 is a diagram illustrating a comparison of stress distributions in a straight region and a bending region after the annealing treatment for a carbonyl group.
Figure 14:
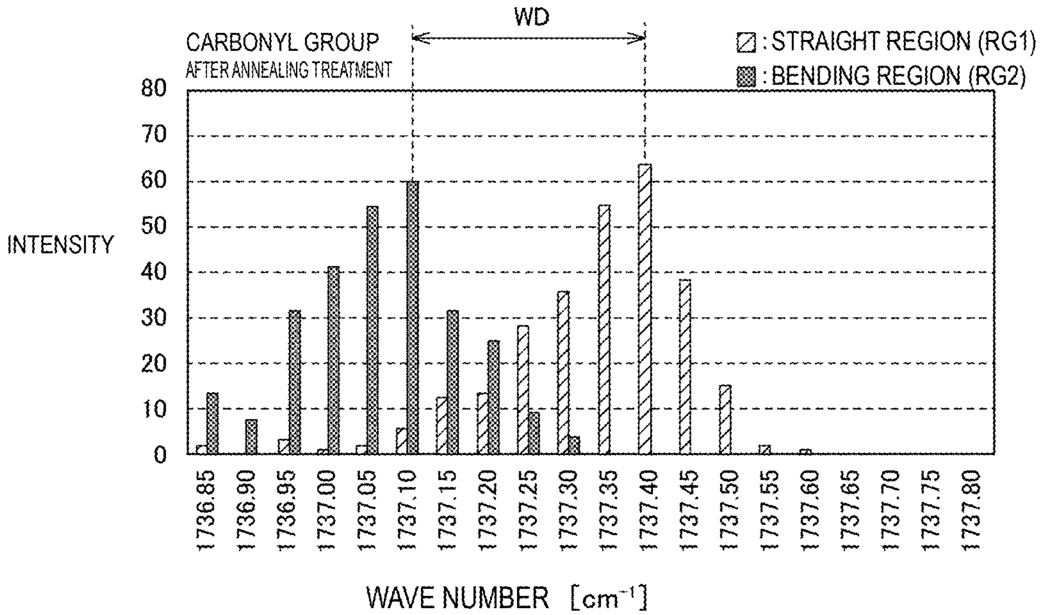
FIG. 14 is a graph illustrating a Raman spectrum in the case of FIG. 13.

FIGS. 13 and 14 are diagrams comparing the stress distribution (FIG. 13) and the Raman spectrum (FIG. 14) in the straight region RG1 and the bending region RG2 after the annealing treatment, illustrated in FIGS. 9 to 12 above. As illustrated in FIGS. 13 and 14, in the bending region RG2, where the residual stress is generated after the annealing treatment, when the stress is relaxed by the annealing treatment, the wave number which is the mode value in the Raman spectrum is shifted to the low wave number side compared to the straight region RG1.

The wave numbers of the straight region RG1 and the bending region RG2 before the annealing treatment are substantially the same (zero wave number difference), but after the annealing treatment, the wave number difference between the straight region RG1 and the bending region RG2 is 0.3 $cm^{-1}$. As described above, in the bending region RG2, where the residual stress is generated in the bending step, since the residual stress is relaxed by the annealing treatment, deformation caused by the subsequent heat treatment can be suppressed. At this time, as a result, the wave number which is the mode value in the Raman spectrum is shifted compared to the straight region RG1, and the wave number difference between the straight region RG1 and the bending region RG2 increases.

As illustrated in FIG. 10, even in the straight region RG1 where no residual stress is generated in the bending step, there is a possibility that a wave number difference of approximately 0.05 $cm^{-1}$ occurs. Therefore, by setting the wave number difference between the straight region RG1 and the bending region RG2 after the annealing treatment to be 0.1 $cm^{-1}$ or more, the deformation caused by the subsequent heat treatment can be suppressed.

Figure 15:
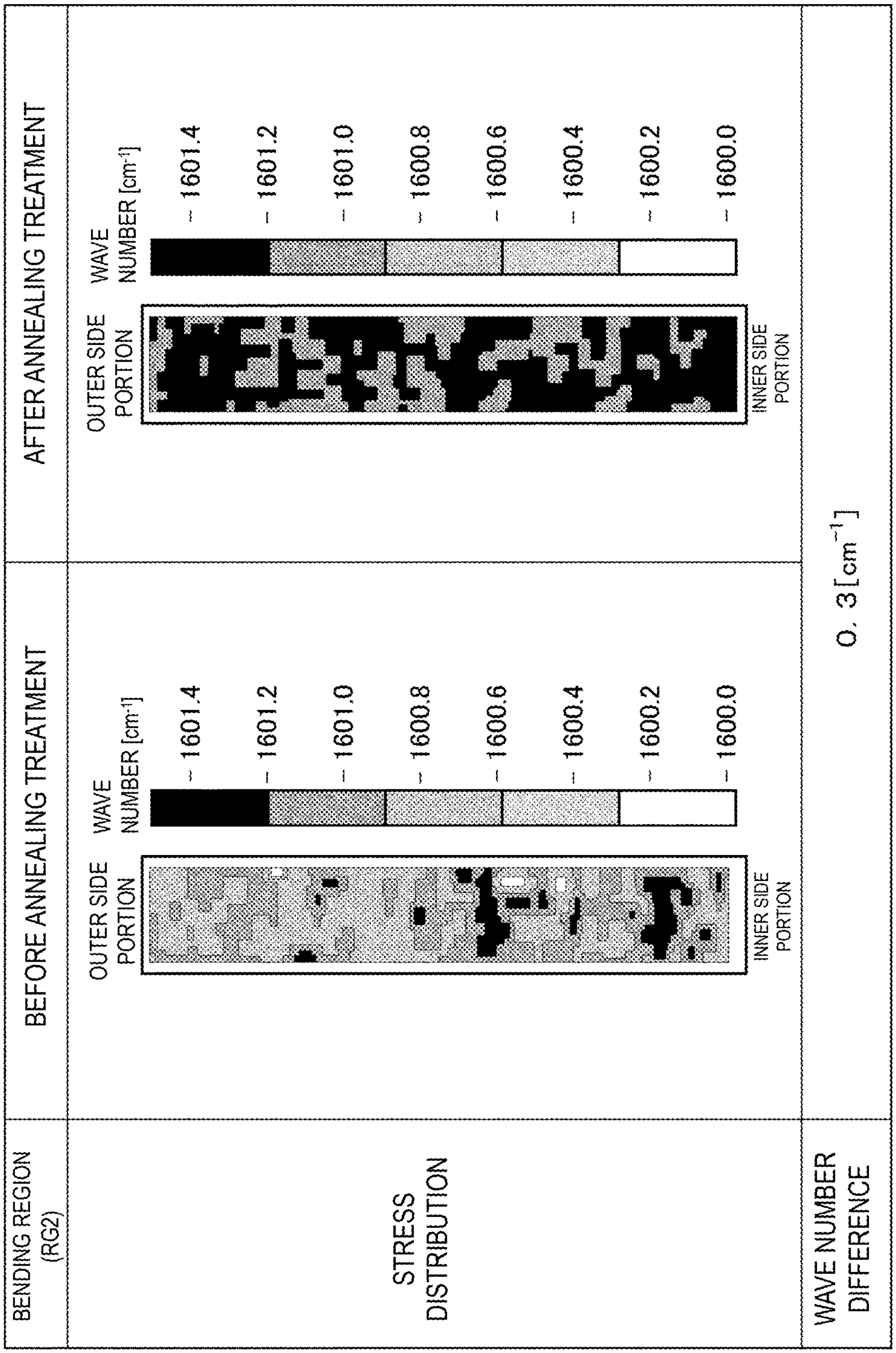
FIG. 15 is a diagram illustrating a comparison of stress distributions in a straight region and a bending region after the annealing treatment for a benzene ring.
Figure 16:
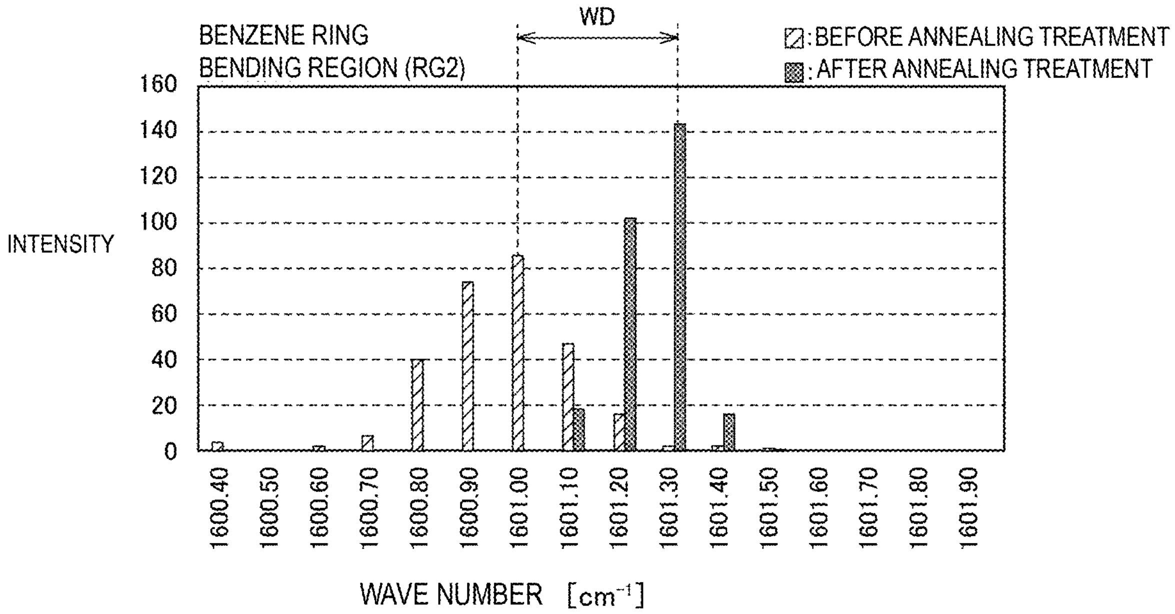
FIG. 16 is a graph illustrating a Raman spectrum in the case of FIG. 15.

FIGS. 15 and 16 are diagrams illustrating the stress distribution (FIG. 15) and the Raman spectrum (FIG. 16) of the bending region RG2 after the annealing treatment in a case of focusing on the benzene ring included in the CPL. In the case of the benzene ring, unlike the case of the carboxyl group, the wave number is generally larger after the annealing treatment than before the annealing treatment, but the overall stress distribution is more uniform after the annealing treatment. In the case of the benzene ring, the wave number difference between the straight region RG1 and the bending region RG2 after the annealing treatment is 0.3 $cm^{-1}$.

As described above, although the shift direction of the wave number which is the mode value in the Raman spectrum is different, even in the case of the benzene ring, the residual stress in the bending region RG2 is relaxed by the annealing treatment, and the wave number difference between the straight region RG1 and the bending region RG2 after the annealing treatment is increased.

Figure 17:
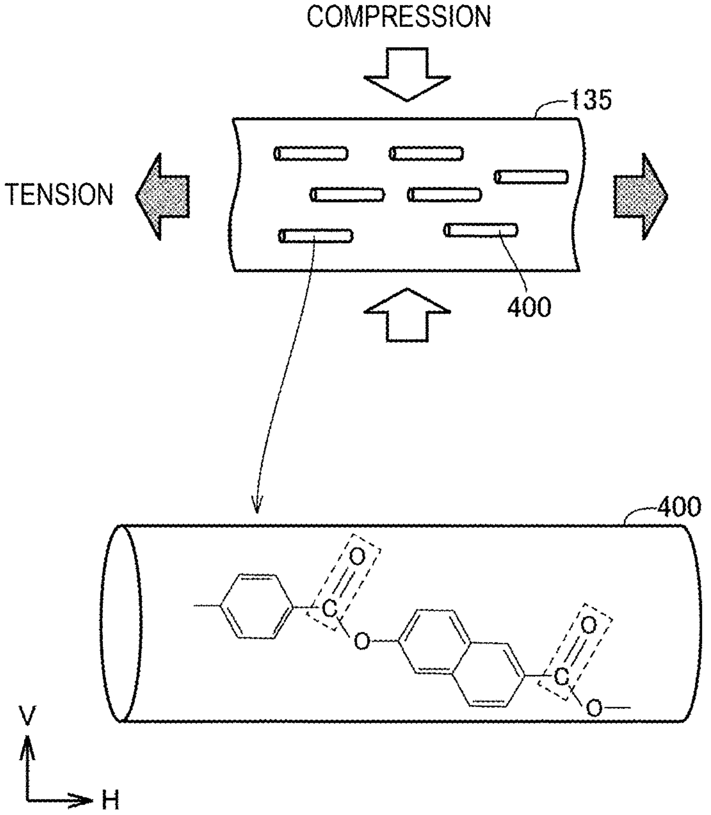
FIG. 17 is a diagram illustrating a shift direction of a Raman spectrum during stress relaxation for a carbonyl group and a benzene ring.

The reason why the shift direction of the wave number due to the relaxation of residual stress is different between the carbonyl group and the benzene ring will be described with reference to FIG. 17. As illustrated in the lower stage of FIG. 17, the molecule 400 of CPL forming the dielectric substrate 105 generally has a shape that is elongated in one direction to which benzene rings are coupled. In FIG. 17, the molecule 400 of CPL is schematically represented by a cylinder. Within the dielectric substrate 105, the molecule 400 of CPL extends in a direction along the main surface.

In this state, when the dielectric substrate 105 is bent in the bending step, as illustrated in the upper stage of FIG. 17, the compressive stress acts in the thickness direction (V direction) of the bending portion 135, and the tensile stress acts in the in-plane direction (H direction). At this time, as illustrated in the lower stage of FIG. 17, since the benzene rings are coupled in the H direction, the tensile stress acts on the benzene rings. Therefore, before the annealing treatment, the Raman spectrum is shifted to the low wave number side from a state where no stress acts due to the influence of the residual stress. When the annealing treatment is applied from this state, the residual stress in the tensile direction is relaxed, so that the Raman spectrum is considered to shift to the high wave number side.

On the other hand, the double coupling between carbon and oxygen of the carbonyl group exists in a state inclined in the V direction. Therefore, in the bending step, the compressive stress acts on the carbonyl group. As a result, before the annealing treatment, the Raman spectrum is shifted to the high wave number side from a state where no stress acts due to the influence of the residual stress. When the annealing treatment is applied, the intermolecular coupling between carbon and oxygen extends in the V direction where the thermal expansion coefficient is large, and the compressive stress is relaxed. As a result, it is considered that the Raman spectrum after the annealing treatment shifts from the state before the annealing treatment to the low wave number side.

As described above, the shift direction of the Raman spectrum, when stress is relaxed by the annealing treatment, differs depending on the arrangement structure of the molecules constituting the substrate material, but as the residual stress is relaxed by the annealing treatment, the wave number difference between the straight region where the influence of residual stress is small and the bending region where the influence of residual stress is large increases.

As described above, in the manufacturing process of the antenna module that can radiate radio waves in two different directions by bending the dielectric substrate, by performing annealing treatment in a state where the shape of the dielectric substrate after bending is constrained and uniformizing the stress distribution generated in the bending portion, deformation of the dielectric substrate during the subsequent heat treatment can be suppressed. At this time, by setting the wave number difference between the straight region and the bending region in the stress distribution obtained by Raman scattering spectroscopic analysis of the bending portion to be 0.1 $cm^{-1}$ or more by the annealing treatment, the deformation of the dielectric substrate can be suppressed.

In the above description, the antenna module in which the radiating element is disposed on the dielectric substrate is described, but the features of the present disclosure can also be applied to a single dielectric substrate having a bending portion on which a ground electrode, power supply wiring, and the like are disposed for supplying a high frequency signal to a radiating element placed on a separate substrate or housing. In this case, the deformation of the dielectric substrate can be suppressed by setting the wave number difference between the straight region and the bending region in the dielectric substrate to be 0.1 $cm^{-1}$ or more.

The exemplary embodiment disclosed herein is required to be considered to be an example and not restrictive in all respects. The scope of the present disclosure is indicated by the claims rather than the description of the above-described exemplary embodiment, and is intended to include all changes within the meaning and range of equivalents to the claims.

REFERENCE SIGNS LIST

10 Communication device
20 Mounting substrate
21 Surface
22 Side surface
100 Antenna module
105 Dielectric substrate
110 RFIC
111A to 111H, 113A to 113H, 117A, 117B Switch
112AR to 112HR Low noise amplifier
112AT to 112HT Power amplifier
114A to 114H Attenuator
115A to 115H Phase shifter
116A, 116B Distributor
118A, 118B Mixer
119A, 119B Amplifier circuit
120 Antenna device
121A, 121B Radiating element
125 SiP module
130A, 130B Flat portion
133 Protrusion portion
134 Boundary portion
135 Bending portion
136 Notched portion
140, 145 Connector
150 Slit
170A, 170B Power supply wiring
190 Electrode
195 Recessed portion
200 BBIC
300 Holding tool
350 Heating device
400 Molecule
GND Ground electrode
RG1 Straight region
RG2 Bending region

The invention claimed is:

1. An antenna module comprising:
a dielectric substrate; and
a first radiating element disposed on the dielectric substrate, wherein
the dielectric substrate includes
a first flat portion and a second flat portion having a normal direction different from a normal direction of the first flat portion, and
a bending portion that connects the first flat portion and the second flat portion,
the first radiating element is disposed in the first flat portion,
the bending portion has a bending region having a curvature,
the first flat portion and the second flat portion have a straight region having no curvature, and
in a Raman spectrum obtained by Raman scattering spectroscopic analysis of a cross section of the dielectric substrate, a wave number difference indicating a difference between a wave number which is a mode value in the straight region and a wave number which is a mode value in the bending region is 0.1 $cm^{-1}$ or more.

2. The antenna module according to claim 1, further comprising:
a second radiating element disposed in the second flat portion.

3. The antenna module according to claim 2, wherein
the second flat portion includes a protrusion portion that partially protrudes from a boundary portion between the bending portion and the second flat portion along the second flat portion in a direction of the first flat portion,
the second flat portion is connected to the bending portion at a position in the second flat portion where the protrusion portion is not present, and
at least a part of the second radiating element is disposed in the protrusion portion.

4. The antenna module according to claim 1, further comprising:

a power supply circuit configured to supply a high frequency signal to at least the first radiating element and the second radiating element.

5. The antenna module according to claim 4, wherein the power supply circuit is disposed in the first flat portion.

6. A communication device that includes the antenna module according to claim 1.

7. A communication device that includes the antenna module according to claim 2.

8. A communication device that includes the antenna module according to claim 3.

9. A communication device that includes the antenna module according to claim 4.

10. A communication device that includes the antenna module according to claim 5.

11. A manufacturing method of an antenna module, the method comprising:

disposing a radiating element on a dielectric substrate;

bending the dielectric substrate; and performing an annealing treatment in a state where the dielectric substrate is held in a holding tool configured to fix a shape of the bent dielectric substrate.

12. The manufacturing method according to claim 11, wherein a first flat portion, a second flat portion, and a bending portion that connects the first flat portion and the second flat portion are formed on the dielectric substrate during the bending, the bending portion has a bending region having a curvature, the first flat portion and the second flat portion have a straight region having no curvature, and after the annealing treatment, in a Raman spectrum obtained by Raman scattering spectroscopic analysis of a cross section of the dielectric substrate, a wave number difference indicating a difference between a wave number which is a mode value in the straight region and a wave number which is a mode value in the bending region is 0.1 $cm^{-1}$ or more.

13. The manufacturing method according to claim 12, wherein an opening angle of the bending portion after the annealing treatment with respect to before the annealing treatment is less than 10°.

14. The manufacturing method according to claim 11, wherein the bending includes bending the dielectric substrate using the holding tool.

15. The manufacturing method according to claim 11, wherein the bending includes mounting a power supply circuit configured to supply a high frequency signal to the radiating element on the dielectric substrate, and bending the dielectric substrate after mounting the power supply circuit.

16. The manufacturing method according to claim 15, wherein performing the annealing treatment includes heating the power supply circuit in a state of being mounted on the dielectric substrate.

17. The manufacturing method according to claim 11, wherein performing the annealing treatment includes a step of heating the dielectric substrate in an atmosphere of 150° C. for 60 minutes.

18. A dielectric substrate comprising:

a first flat portion and a second flat portion with a normal direction different from a normal direction of the first flat portion; and a bending portion that connects the first flat portion and the second flat portion, wherein the bending portion has a bending region having a curvature, the first flat portion and the second flat portion have a straight region having no curvature, and in a Raman spectrum obtained by Raman scattering spectroscopic analysis of a cross section of the dielectric substrate, a wave number difference indicating a difference between a wave number which is a mode value in the straight region and a wave number which is a mode value in the bending region is 0.1 $cm^{-1}$ or more.

19. The antenna module according to claim 1, wherein the dielectric substrate includes a resin substrate.

20. The antenna module according to claim 19, wherein the resin substrate is a liquid crystal polymer resin substrate.

* * * * *